(12) United States Patent
Chang

(10) Patent No.: US 11,387,941 B2
(45) Date of Patent: Jul. 12, 2022

(54) SIGNAL TRANSCEIVING SYSTEM AND METHOD

(71) Applicant: MACRONIX INTERNATIONAL CO., LTD., Hsinchu (TW)

(72) Inventor: Yao-Jen Chang, Taipei (TW)

(73) Assignee: MACRONIX INTERNATIONAL CO., LTD, Hsinchu (TW)

( * ) Notice: Subject to any disclaimer, the term of this patent is extended or adjusted under 35 U.S.C. 154(b) by 103 days.

(21) Appl. No.: 16/781,396

(22) Filed: Feb. 4, 2020

(65) Prior Publication Data

US 2021/0242969 A1 Aug. 5, 2021

(51) Int. Cl.
*H04J 3/00* (2006.01)
*H04L 1/00* (2006.01)

(52) U.S. Cl.
CPC .... *H04L 1/0091* (2013.01); *H04L 2001/0094* (2013.01)

(58) Field of Classification Search
CPC ..... H04L 49/90; H04L 5/0007; H04L 5/0048; H04L 7/0008; H04L 1/0091; H04L 2001/0094; H04N 21/2383
See application file for complete search history.

(56) References Cited

U.S. PATENT DOCUMENTS

| | | | | |
|---|---|---|---|---|
| 4,322,832 A * | 3/1982 | Sartorius | ................. | G01S 17/10 368/47 |
| 8,565,033 B1 * | 10/2013 | Manohararajah | ........ | G11C 5/04 365/233.17 |
| 9,876,492 B1 * | 1/2018 | Haneda | .................... | H03K 5/24 |
| 2003/0031440 A1 * | 2/2003 | Dennis | ............... | H04B 10/2916 385/123 |
| 2003/0091259 A1 * | 5/2003 | Ooi | ........................ | G02F 1/2255 385/3 |
| 2003/0208329 A1 * | 11/2003 | Brown | .................... | G01P 3/489 702/79 |
| 2005/0117574 A1 * | 6/2005 | Hiramatsu | ............ | H04L 12/403 370/389 |
| 2006/0140284 A1 * | 6/2006 | Sheiman | ............... | H04L 25/026 375/257 |

(Continued)

FOREIGN PATENT DOCUMENTS

CN 110325929 A 10/2019

OTHER PUBLICATIONS

Peterson, et al.: "Computer Networks"; Mar. 11, 2011; Morgan Kaufann Pub http://titania.ctie.monash.edu.au/netperf/docs/computer-networks-peterson-davie-v5-2; pp. 1-50.

(Continued)

*Primary Examiner* — Atique Ahmed
(74) *Attorney, Agent, or Firm* — McClure, Qualey & Rodack, LLP

(57) ABSTRACT

A signal transceiving system includes: a first signal transceiver terminal; and a second signal transceiver terminal wired coupled to the first signal transceiver terminal. The first signal transceiver terminal transmits a digital signal to the second signal transceiver terminal. In response to detection of a first signal edge, the second signal transceiver terminal starts counting of a first time slot. Based on a count of at least one signal edge detected during the first time slot, the second signal transceiver terminal judges the digital signal as being logic "0" or logic "1".

18 Claims, 5 Drawing Sheets

(56) References Cited

U.S. PATENT DOCUMENTS

| | | | |
|---|---|---|---|
| 2007/0285246 A1* | 12/2007 | Koyama | G06F 1/263 |
| | | | 257/E27.111 |
| 2010/0157959 A1* | 6/2010 | Hiben | H04W 72/04 |
| | | | 370/337 |
| 2010/0182851 A1* | 7/2010 | Lee | G11C 11/40611 |
| | | | 365/222 |
| 2011/0115537 A1* | 5/2011 | May | H04L 7/0045 |
| | | | 327/170 |
| 2015/0063326 A1* | 3/2015 | Khoo | H04W 72/0446 |
| | | | 370/337 |
| 2016/0127109 A1* | 5/2016 | Shimosakoda | H04B 17/309 |
| | | | 370/276 |
| 2016/0204815 A1* | 7/2016 | Su | H04W 24/10 |
| | | | 455/558 |
| 2016/0212741 A1* | 7/2016 | Talukdar | H04W 72/042 |
| 2019/0385057 A1 | 12/2019 | Litichever et al. | |
| 2020/0210079 A1* | 7/2020 | Cho | G06F 3/0625 |

OTHER PUBLICATIONS

TW Office Action dated Dec. 16, 2020 in Taiwan application (No. 109103340).

* cited by examiner

SIGNAL TRANSCEIVING SYSTEM AND METHOD

TECHNICAL FIELD

The disclosure relates in general to a signal transceiving system and a signal transceiving method.

BACKGROUND

In transmitting high frequency (for example, 200 MHz) single-ending signal, how to maintain good digital signal transmission quality is a challenge to printed circuit board (PCB) layout.

When the signal frequency is high, digital signal transmission quality may be easily affected by poor PCB layout, interference from system inside or system outside, and noise; and thus voltage level shift, signal delays problem are occurred. Thus, digital signal reception may be not successful.

SUMMARY

According to one embodiment, provided is a signal transceiving system including: a first signal transceiver terminal; and a second signal transceiver terminal wired coupled to the first signal transceiver terminal; wherein the first signal transceiver terminal transmits a digital signal to the second signal transceiver terminal; in response to detection of a first signal edge, the second signal transceiver terminal starts counting of a first time slot; and based on a count of at least one signal edge detected during the first time slot, the second signal transceiver terminal judges the digital signal as being logic "0" or logic "1".

According to another embodiment, provided is a signal transceiving method applied to a signal transceiving system including a first signal transceiver terminal a second signal transceiver terminal wired coupled to the first signal transceiver terminal. The signal transceiving method includes: transmitting a digital signal from the first signal transceiver terminal to the second signal transceiver terminal; in response to detection of a first signal edge, starting counting of a first time slot by the second signal transceiver terminal; and based on a count of at least one signal edge detected during the first time slot, judging the digital signal as being logic "0" or logic "1" by the second signal transceiver terminal.

Figure 1:
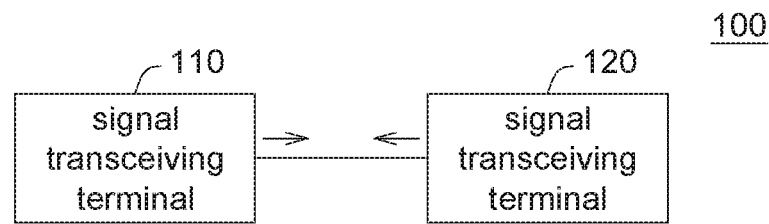
FIG. 1 shows a diagram for a signal transceiving system according to one embodiment of the application.

In the following detailed description, for purposes of explanation, numerous specific details are set forth in order to provide a thorough understanding of the disclosed embodiments. It will be apparent, however, that one or ore embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a diagram for a signal transceiving system according to one embodiment of the application. As shown in FIG. 1, the signal transceiving system includes a first signal transceiving terminal 110 and a second signal transceiving terminal 120. The first signal transceiving terminal 110 and the second signal transceiving terminal 120 are wired coupled for signal transmission. The first signal transceiving terminal 110 and the second signal transceiving terminal 120 may transmit digital signals. In the following, the wired coupling between the first signal transceiving terminal 110 and the second signal transceiving terminal 120 may be also referred as a "bus".

When the first signal transceiving terminal 110 is a transmitter, the second signal transceiving terminal 120 is a receiver. When the second signal transceiving terminal 120 is a transmitter, the first signal transceiving terminal 110 is a receiver.

Figure 2A:
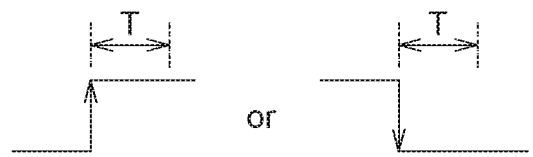
FIG. 2A shows a diagram for transmitting logic "0" according to one embodiment of the application.
Figure 2B:
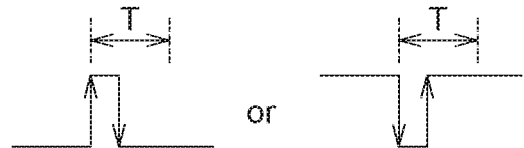
FIG. 2B shows a diagram for transmitting logic "1" according to one embodiment of the application.

FIG. 2A shows a diagram for transmitting logic "0" according to one embodiment of the application; and FIG. 2B shows a diagram for transmitting logic "1" according to one embodiment of the application.

In an embodiment of the application, "information" is obtained by detecting signal edges. In here, "information" refers to a count of signal edge(s) detected during a time slot T. Based on a count of signal edge(s) detected during the time slot T, the receiver may determine whether the received digital signal is logic "0" or logic "1".

For example, during a time slot T, if the receiver detects odd signal edge(s), then the receiver determines that the received digital signal as being logic "0". During a time slot T, if the receiver detects even signal edge(s), then the receiver determines that the received digital signal as being logic "1". The signal edge indicates a signal rising edge or a signal falling edge.

Further, in an embodiment of the application, when the receiver detects a first signal edge (or said an initial signal edge), the receiver starts counting a time slot T. That is, the time slot T is triggered by detection of a first signal edge. By so, data transceiving error caused by timing error accumulated from the two terminals (the receiver and the transmitter) may be prevented. Signal sampling errors which may be caused by signal delay problem (due to PCB (printed circuit board) layout) is also prevented.

As shown in FIG. 2A, when the receiver detects a first signal edge, the receiver starting counting of the time slot T. If the receiver detects one signal edge during the time slot T, the receiver determines the digital signal as being logic "0". Or, if the receiver detects odd signal edge(s) during the time slot T, the receiver determines the digital signal as being logic "0".

As shown in FIG. 2B, when the receiver detects a first signal edge, the receiver starting counting of the time slot T. If the receiver detects two signal edges during the time slot T, the receiver determines the digital signal as being logic "1". Or, if the receiver detects even signal edges during the time slot T, the receiver determines the digital signal as being logic "1".

In an embodiment of the application, the time length of the time slot T is predetermined, or dynamically determined by the transmitter and the receiver. These are within the spirit and scope of the application.

Figure 2C:
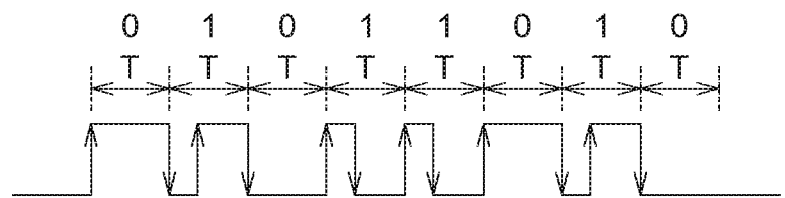
FIG. 2C shows a diagram for transmitting a plurality of digital signals according to one embodiment of the application.

FIG. 2C shows a diagram for transmitting a plurality of digital signals according to one embodiment of the application. As shown in FIG. 2C, when the first signal edge is detected, the first time slot T begins (that is, detection of the first signal edge triggers the time slot T). During the first time slot T, one signal edge is detected and thus the receiver determines that the first digital signal is logic "0". Similarly, in the second time slot T, two signal edges are detected and thus the receiver determines that the second digital signal is logic "1". By so, the receiver determines that the following digital signals are logic "0", "1", "1", "0", "1" and "0".

Figure 2D:
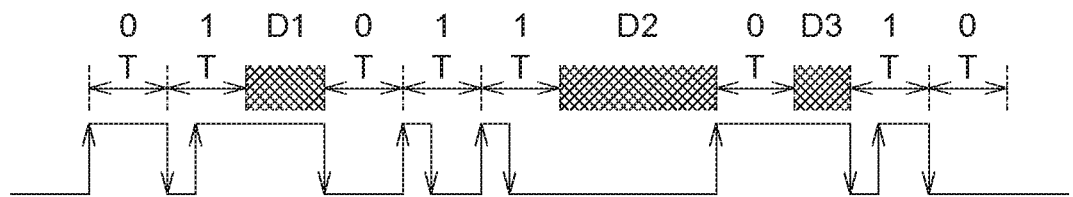
FIG. 2D shows a diagram for transmitting a plurality of digital signals according to one embodiment of the application.

FIG. 2D shows a diagram for transmitting a plurality of digital signals according to one embodiment of the application. Different from FIG. 2C, in FIG. 2D, in an embodiment of the application, even if delays are occurred during transmission, the digital signals are correctly determined by the receiver. Similarly, in the first two time slots, the receiver determines that the first two digital signals are logic "0" and "1". Then, a delay D1 is occurred (that is, during the delay D1, the receiver does not detect any signal edge). After the delay D1, the receiver detects the following signal edge; the third time slot T is triggered and the receiver receives the digital signals. Thus, in the third time slot, the fourth time slot and the fifth time slot, the receiver determines that the digital signals are logic "0", "1" and "1".

Then, another delay D2 is occurred (that is, during the delay D2, the receiver does not detect any signal edge). After the delay D2, the receiver detects the following signal edge; the sixth time slot T is triggered and thus the receiver receives the digital signals. Thus, in the sixth time slot T, the receiver determines that the digital signal is logic "0".

Then, another delay D3 is occurred (that is, during the delay D3, the receiver does not detect any signal edge). After the delay D3, the receiver detects the following signal edge; the seventh time slot T is triggered and thus the receiver receives the digital signals. Thus, in the seventh time slot T and the eighth time slot T, the receiver determines that the digital signal is logic "1" and "0".

Further, in one embodiment of the application, the time length of the allowable delay may be predetermined. Alternatively, before signal transmission, the transmitter and the receiver may communicate to determine the time length of the allowable delay. For example but not limited by, the time length of the allowable delay may be 100 time slots. If within the allowable delay, the receiver detects the next signal edge, then the signal transmission continues; and on the other hand, if within the allowable delay, the receiver does not detect any signal edge, then the signal transmission is failed and the receiver skips the digital signals received during this transmission.

That is, as shown in FIG. 2D, when the delay D1 is larger than the allowable delay, the receiver determines that the signal transmission is failed and skips the digital signals (logic "0" and "1") received during the first two time slots.

Figure 3:
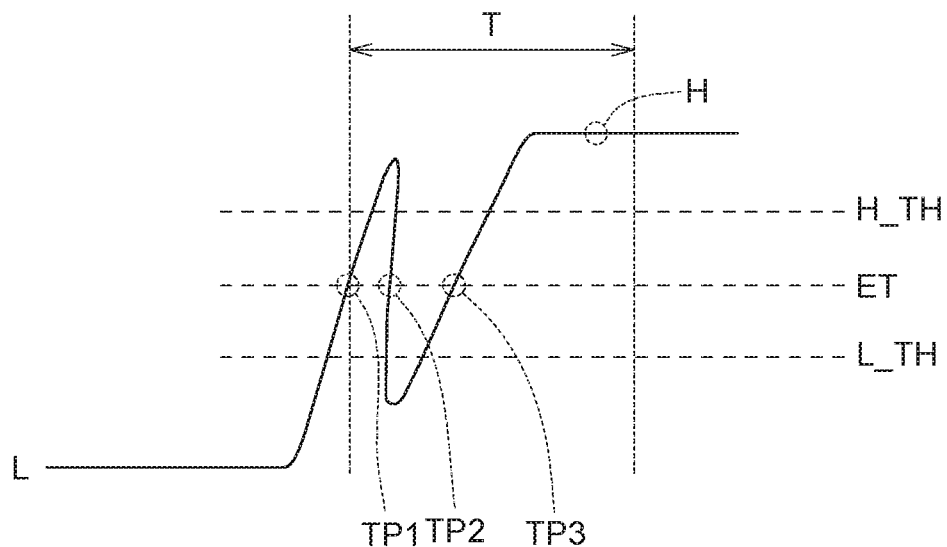
FIG. 3 shows anti-noise interference according to one embodiment of the application.

FIG. 3 shows anti-noise interference according to one embodiment of the application. The symbol "H_TH" refers to a logic H level threshold; the symbol "L_TH" refers to a logic L level threshold; and the symbol "ET" refers to a signal edge trigger reference level. When the detected signal level is transited from being lower than the logic L level threshold L_TH to being higher than the signal edge trigger reference level ET, then a signal rising edge is detected. Similarly, when the detected signal level is transited from being higher than the logic H level threshold H_TH to being lower than the signal edge trigger reference level ET, then a signal falling edge is detected. When the first signal edge on the bus is detected, the receiver records the first signal edge as being the signal rising edge or the signal falling edge.

As shown in FIG. 3, the signal level on the bus is low level (lower than the logic L level threshold L_TH). At the time point TP1, the receiver detects that the signal level on the bus is higher than the signal edge trigger reference level ET and thus the receiver determines that a first signal edge (which is a signal rising edge) is detected at the time point TP1. Thus, the receiver starts counting of the first time slot T. At the time point TP2, the receiver detects that the signal level on the bus is transited from being higher than the logic H level threshold H_TH to being lower than the signal edge trigger reference level ET, and thus the receiver determines that a second signal edge (which is a signal falling edge) is detected at the time point TP2. At the time point TP3, the receiver detects that the signal level on the bus is transited from being lower than the logic L level threshold LTH to being higher than the signal edge trigger reference level ET, and thus the receiver determines that a third signal edge (which is a signal rising edge) is detected at the time point TP3.

Because three signal edges are detected during the time slot T, the receiver determines that the digital signal is logic "0".

That is, in transmitting logic "0", the transmitter sends odd signal edge(s) (or one signal edge). If there is no noise interference, then during the time slot T, the receiver will receive the same number of signal edge(s). However, due to noise interference, the signal level on the bus may have unexpected variation. But, sending odd signal edge(s) from the transmitter means that the signal level on the bus will be transited from the low level (at the beginning of the time slot) to the high level (at the end of the time slot), or that the signal level on the bus will be transited from the high level (at the beginning of the time slot) to the low level (at the end of the time slot). That is to say, no matter how serious the noise interference is, the number of the signal edges during the time slot will be odd if the transmitter transmits logic "0". For example, as shown in FIG. 3, in order to send logic "0", the transmitter sends out one signal edge, but the receiver receives three signal edges.

Similarly, in transmitting logic "1", the transmitter sends even signal edges. If there is no noise interference, then during the time slot T, the receiver receive the same number of signal edge(s). However, due to noise interference, the signal level on the bus may have unexpected variation. But, sending even signal edges from the transmitter refers to that the signal level on the bus will be transited from the low level (at the beginning of the time slot) to the high level and back to the low level (at the end of the time slot), or that the signal level on the bus will be transited from the high level (at the beginning of the time slot) to the low level and back to the high level (at the end of the time slot). That is to say, in transmitting logic "1", no matter how serious the noise interference is, the number of the signal edges during the time slot will be even. For example, in order to send logic "1", the transmitter sends out two signal edges, but the receiver receives four signal edges.

Thus, in one embodiment of the application, the data accuracy will be further improved if the receiver additionally detects the signal level on the bus at the end of the time slot.

Figure 4:
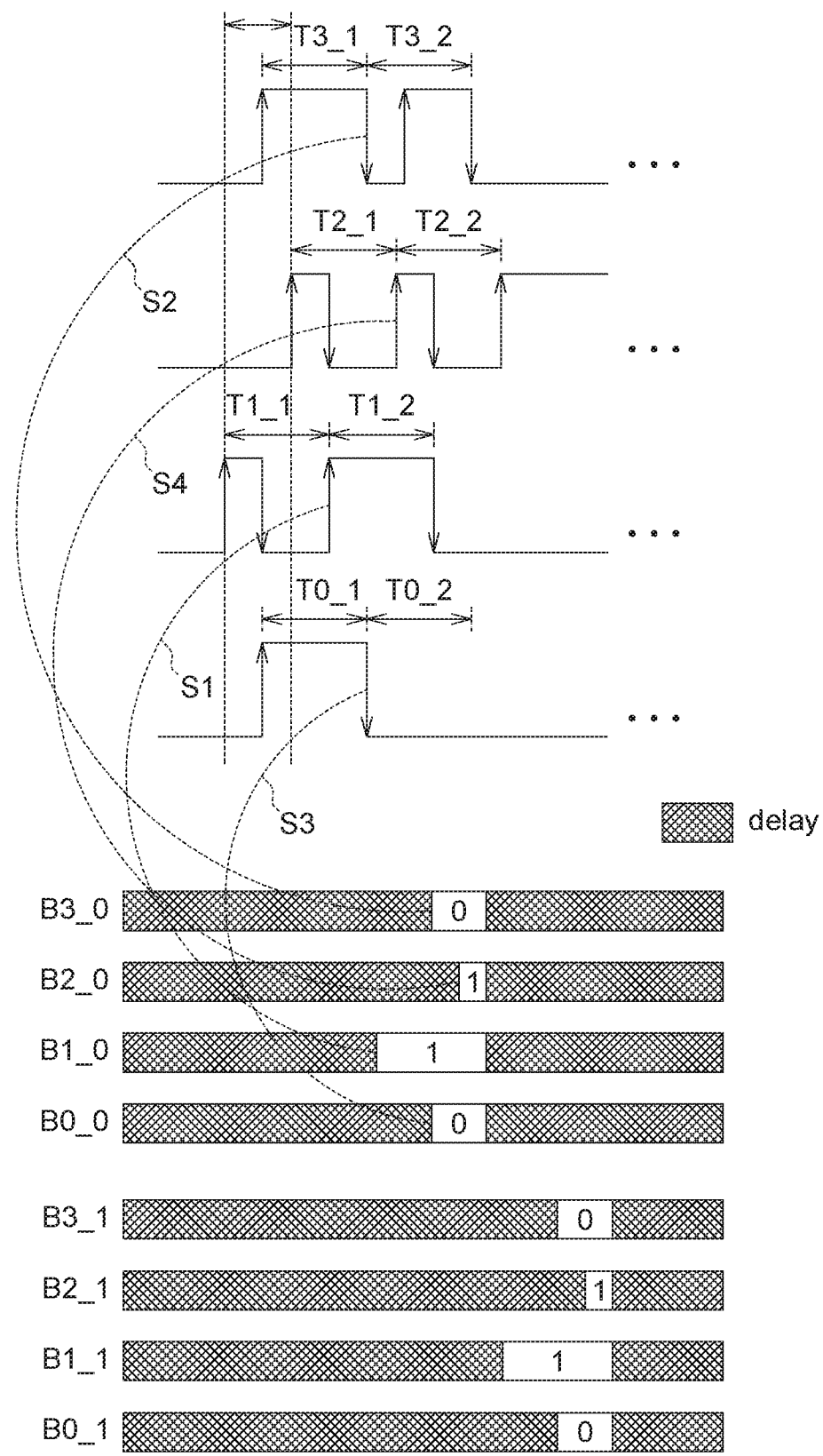
FIG. 4 shows signal transmission according to one embodiment of the application.

FIG. 4 shows signal transmission according to one embodiment of the application for solving transmission delay problem. For simplicity, the receiver receives the digital signals from the transmitter via four input/output pins I/O 0-I/O 3 (also referred as an input/output pin group). Also, the transmitter has four input/output pins for transmitting the digital signals. The application is not limited by this. Because the receiver uses the four input/output pins I/O 0-I/O 3 for receiving the digital signals, the time slots corresponding to the input/output pins I/O 0-I/O 3 are independently counted. Further, the input/output pin I/O 0 is related to buffers B0_0 and B0_1; the input/output pin I/O 1 is related to buffers B1_0 and B1_1; the input/output pin I/O 2 is related to buffers B2_0 and B2_1; and the input/output pin I/O 3 is related to buffers B3_0 and B3_1.

As shown in FIG. 4, assume that the earliest signal edge appears on the input/output pin I/O 1, and thus the first time slot T1_1 corresponding to the input/output pin I/O 1 starts for counting. When the first time slot T1_1 ends, the receiver determines that two signal edges are received and the receiver determines that the first digital signal received via the input/output pin I/O 1 is logic "1". The receiver writes the first digital signal as logic "1" into the buffer B0_0 (as shown by the step S1).

Similarly, when signal edges are detected on the input/output pins I/O 3 and the input/output pin I/O 0, respectively, the first time slot T3_1 (corresponding to the input/output pin I/O 3) and the first time slot T0_1 (corresponding to the input/output pin I/O 0) start for counting. When the first time slot T3_1 ends, the receiver determines that one signal edge is received and the receiver determines that the first digital signal received via the input/output pin I/O 3 is logic "0". The receiver writes the first digital signal as logic "0" into the buffer B3_0 (as shown by the step S2). When the first time slot T0_1 ends, the receiver determines that one signal edge is received and the receiver determines that the first digital signal received via the input/output pin I/O 0 is logic "0". The receiver writes the first digital signal as logic "0" into the buffer B0_0 (as shown by the step S3).

Similarly, when a first signal edge is detected on the input/output pin I/O 2, the first time slot T2_1 (corresponding to the input/output pin I/O 2) starts for counting. When the first time slot T2_1 ends, the receiver determines that two signal edges are received and the receiver determines that the first digital signal received via the input/output pin I/O 2 is logic "1". The receiver writes the first digital signal as logic "1" into the buffer B2_0 (as shown by the step S4).

Similarly, based on the number of the signal edges detected during the time slots T0_2-T3_2, the receiver determines that the digital signals received via the four input/output pins I/O 0-I/O 3 are logic "0", "0", "1" and "1" and writes the digital signals (logic "0", "0", "1" and "1") into the buffers B0_1-B3_1.

When four digital signals (corresponding to the input/output pins) are stored in the corresponding buffers (for example B0_0-B3_0), the receiver reads out the digital signals and then reset the buffer as wait mode. That is, the buffers B0_0-B3_0 are as one buffer group and the buffers B0_1-B3_1 are as another buffer group. After all buffers in the same buffer group are written, the receiver reads out all data and resets the buffer groups as the wait mode. Then, the receiver writes data into another buffer group. Of course, the buffer groups are within the receiver.

Although FIG. 4 shows two buffer groups, in other possible embodiment of the application, if needed (for example delays are more serious), there may be more buffer groups in the receiver and digital signals are alternatively written into and read from the buffer groups.

That is, even if respective delays on the input/output pins are different, by allocating a plurality of buffers in the receiver, digital signals are alternatively written into and read from the buffers to solve the transmission delays.

Figure 5:
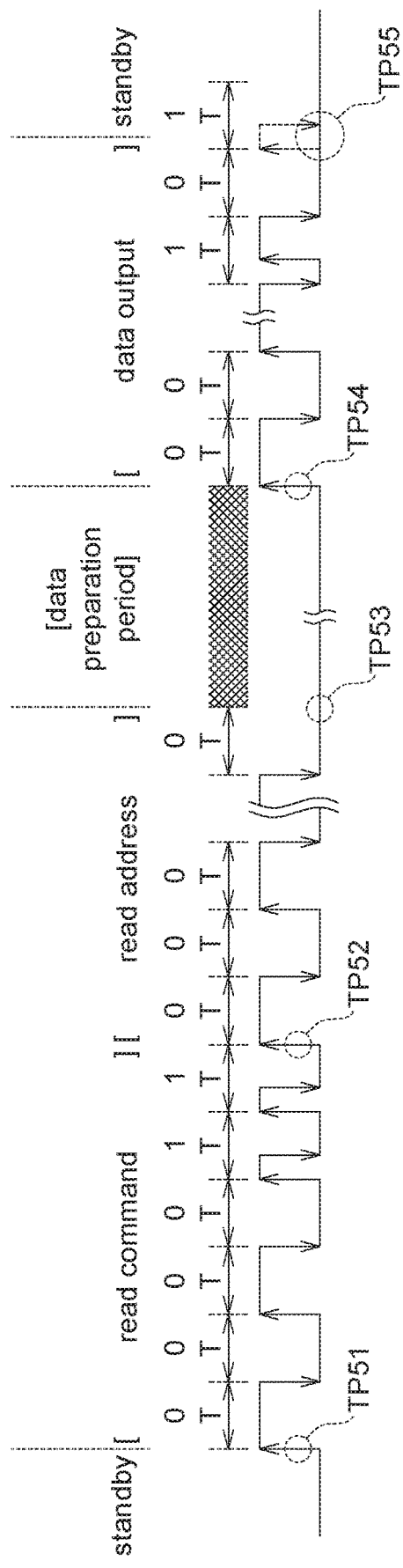
FIG. 5 shows signal transmission according to one embodiment of the application.

FIG. 5 shows signal transmission according to one embodiment of the application. As shown in FIG. 5, taking the transmitter as the microcontroller (MCU) and the receiver as the flash memory, how to implement Serial Peripheral Interface (SPI) read operation by one input/output pin is described. As known, in prior art, SPI bus includes three signal lines: Serial Clock (SCLK), Serial Data Output (SDO) and Serial Data Input (SDI). That is to say, in prior art, the two terminals (i.e. the transmitter and the receiver) on the SPI bus both need three input/output pins to implement SPI transmission. On the contrary, in one embodiment of the application, the two terminals (i.e. the transmitter and the receiver) on the SPI bus both need one input/output pin to implement SPI transmission.

As shown in FIG. 5, in the standby state, the MCU outputs a low level to the bus and the flash memory outputs high-impedance as being in input mode. Thus, in the standby state, the bus is pulled to the low level by the MCU.

When the MCU prepares the read command (for example but not limited by being 8-bit 00001100), the MCU sends the 8-bit read command to the flash memory via the single I/O pin. Thus, at time point TP51, the MCU sends a first signal edge to the bus. When the flash memory detects the first signal edge, the flash memory determines that the MCU starts to transmit read command. That is, in one embodiment of the application, the first signal edge transmitted from the MCU not only refers to the information about the digital signal, but also is used as an enable signal.

After the MCU sends the read command, the MCU sends the read address to the flash memory, as shown by the time point TP52.

At the time point TP53, MCU completes transmission of read address and thus the MCU enters into the input state. Because the flash memory completely receives the read command and the read address, the flash memory determines to prepare data for the MCU. Then, the flash memory prepares data and has to maintain the current bus status (i.e. if at the time point TP53, the bus level is high, then the flash memory has to maintain the current bus status as high level; and vice versa).

At the time point TP54, data for the MCU is ready and the flash memory sends data to the MCU as described in the above embodiments. In one embodiment of the application, data preparation period of the flash memory is not limited. That is, the length between the time point TP53 and TP54 is not limited.

When the MCU determines that the received data is enough, the MCU outputs a low level to the bus to force the bus as the low level. When the flash memory outputs data to the MCU, the flash memory also continuously detects the bus level. If the flash memory detects that the bus level is different from the level sent from the flash memory, then the flash memory determines that the MCU requests to end of data transmission. Thus, the flash memory ends data transmission and then the flash memory returns to the standby state.

That is, for example, at the time point TP55, the flash memory intends to transmit logic "1" (as indicated by dotted line), and thus the flash memory intends to pull the bus level to the high level. But, at the time point TP55, the flash memory detects that the flash memory fails to pull high the bus level, and the flash memory determines that the MCU receives enough data. The flash memory returns to the standby state.

Figure 6:
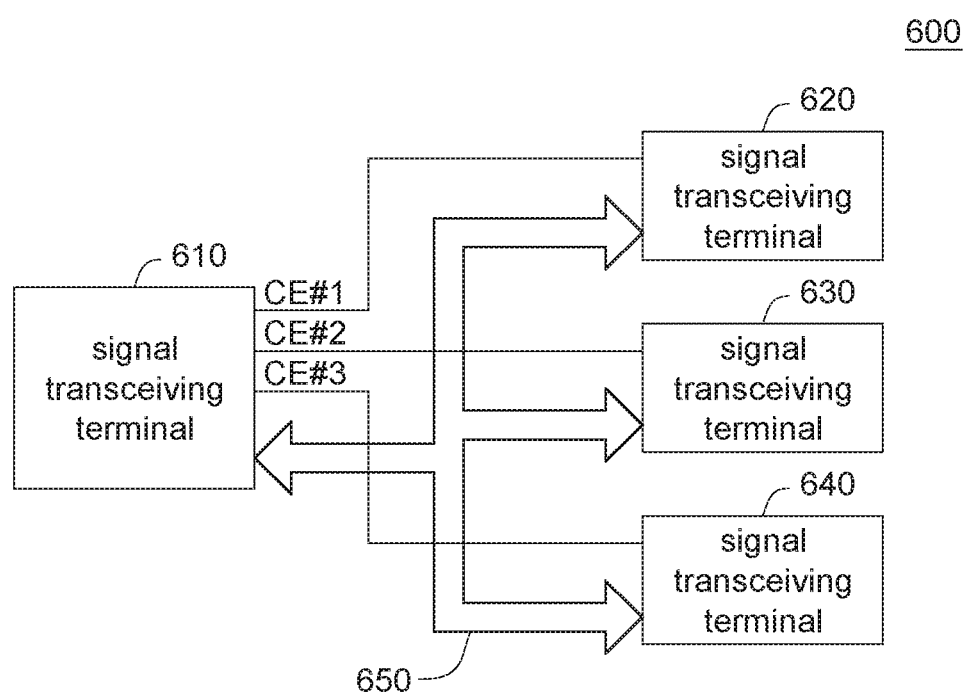
FIG. 6 shows a diagram for a signal transceiving system according to one embodiment of the application.

FIG. 6 shows a diagram for a signal transceiving system according to one embodiment of the application. As shown in FIG. 6, the signal transceiving system 600 includes: a first signal transceiver 610, a second signal transceiver 620, a third signal transceiver 630, a fourth signal transceiver 640 and a share bus 650. Here, the second signal transceiver 620 uses NA pin(s) (NA being a positive integer) of the share bus 650 to transmit and receive digital signal with the first signal transceiver 610; the third signal transceiver 630 uses NB pin(s) (NB being a positive integer) of the share bus 650 to transmit and receive digital signal with the first signal transceiver 610; and the fourth signal transceiver 640 uses NC pin(s) (NC being a positive integer) of the share bus 650 to transmit and receive digital signal with the first signal transceiver 610. NA, NB and NC may be the same or different, which is still within the spirit and the scope of the application.

Respective time slots of the second signal transceiver 620, the third signal transceiver 630 and the fourth signal transceiver 640 may be the same or different. Further, respective time slots of the second signal transceiver 620, the third signal transceiver 630 and the fourth signal transceiver 640 may be predetermined, or determined based on communication between the signal transceiver 620-640 with the first signal transceiver 610, which is still within the spirit and the scope of the application. That is, the length of the respective time slots of the second signal transceiver 620, the third signal transceiver 630 and the fourth signal transceiver 640 may be independently determined.

Further, the first signal transceiver 610 includes three dedicated enable pins CE #0, CE #1 and CE #2. When the first signal transceiver 610 intends to send data or signal to the second signal transceiver 620, the first signal transceiver 610 sends an enable signal (which may be a signal edge) to the second signal transceiver 620 via the enable pin CE #0, for enabling the second signal transceiver 620. Similarly, the first signal transceiver 610 enables the third signal transceiver 630 or the fourth signal transceiver 640 via the enable pins CE #1 or CE #2.

Signal transmission between the first signal transceiver 610 and the second signal transceiver 620, signal transmission between the first signal transceiver 610 and the third signal transceiver 630, and signal transmission the first signal transceiver 610 and the fourth signal transceiver 640 may be the same or similar to the above embodiments, and thus details are not repeated here.

In one possible embodiment of the application, the receiver may include: a signal edge detection circuit, a one shot circuit and a timer. The signal edge detection circuit is used to detect the signal edges. When the signal edge is detected, the one shot circuit will be trigger to start a time slot. The timer is used to count the time slot and the delay. The structures of the signal edge detection circuit, the one shot circuit and the timer are not specified here.

As discussed above, in embodiments of the application, in transmitting digital signals, even if the transmission quality is not good, the digital signal is determined based on the number of the signal edge(s) detected.

Thus, the embodiments of the application have advantages such as, high speed transmission, reliability and anti-noise interference. The embodiments of the application determine the digital signals based on the number of the signal edges detected in one time slot, rather than based on the signal voltage level detected.

Further, in embodiments of the application, even if different delays exist between the input/output pins, the digital signals are correctly determined. Thus, the signal line layout of the PCB will not affect the signal reception accuracy.

Further, the signal transmission in embodiments of the application may be applied in wired digital communication. Embodiments of the application may be applied in system-to-system transmission (for example, wired digital signal transmission between PC and wired mouse), or device-to-device transmission (for example, wired digital signal transmission between hard-disc drive and optical-disc drive) or component-to-component transmission (for example, wired digital signal transmission between microcontroller and flash memory).

In embodiments of the application, digital signal communication may be implemented by using fewer I/O pins (for example, SPI data transmission is implemented by one I/O pin). Thus, embodiments of the application have advantage of low cost by using fewer pins.

In embodiments of the application, before the signal edge is received, the receiver is at the standby state. Thus, embodiments of the application may support dynamic transmission.

Embodiments of the application are applied in transmitting single-ending digital signals but other possible embodiments of the application may be applied in transmitting differential digital signals.

In embodiments of the application, the signal transmission is neither "synchronous transmission" nor "asynchronous transmission".

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A signal transceiving system including:
a first signal transceiver terminal; and
a second signal transceiver terminal wired coupled to the first signal transceiver terminal;
wherein
the first signal transceiver terminal transmits a digital signal to the second signal transceiver terminal;
in response to detection of a first signal edge, the second signal transceiver terminal starts counting of a first time slot; and
based on a count of at least one signal edge detected during the first time slot, the second signal transceiver terminal judges the digital signal as being logic "0" or logic "1"; and
wherein the detection of the first signal edge comprises that signal level of the digital signal rises or falls to a signal edge trigger reference level; and wherein the second signal transceiver terminal includes an input/output pin group and at least two buffer groups, a plurality of digital signals received via the input/output pin groups and determined by the second signal transceiver terminal being alternatively written into and read from the buffer groups.

2. The signal transceiving system according to claim 1, wherein if the count of at least one signal edge detected during the first time slot is odd, the second signal transceiver terminal judges the digital signal as being logic "0".

3. The signal transceiving system according to claim 1, wherein if the count of at least one signal edge detected during the first time slot is even, the second signal transceiver terminal judges the digital signal as being logic "1".

4. The signal transceiving system according to claim 1, wherein the first signal edge includes a signal rising edge or a signal falling edge.

5. The signal transceiving system according to claim 1, wherein a length of the first time slot is predetermined, or dynamically determined by the first signal transceiver terminal and the second signal transceiver terminal.

6. The signal transceiving system according to claim 1, wherein if a delay between two adjacent time slots is longer than an allowable delay length, then the second signal transceiver terminal determines transmission failed.

7. The signal transceiving system according to claim 1, wherein the second signal transceiver terminal further records the first signal edge as being a signal rising edge or a signal falling edge.

8. The signal transceiving system according to claim 1, wherein
the first signal transceiver terminal includes a first pin and the second signal transceiver terminal includes a second pin;
the first signal transceiver terminal and the second signal transceiver terminal are in a standby state;
the first signal transceiver terminal sends an operation command via the first pin to the second signal transceiver terminal, wherein the second signal transceiver terminal is enabled by an initial signal edge of the operation command;
the first signal transceiver terminal sends an address via the first pin to the second signal transceiver terminal;
the first signal transceiver terminal enters into an input state, the second signal transceiver terminal starts to prepare data and the second signal transceiver terminal maintains a current status of a bus;
when the second signal transceiver terminal is ready to output data, the second signal transceiver terminal sends data via the second pin to the first signal transceiver terminal;
if the first signal transceiver terminal determines that data is enough, the first signal transceiver terminal controls a level of the bus and the first signal transceiver terminal returns to the standby state; and
if the second signal transceiver terminal detects that the level of the bus is different from a bus level sent by the second signal transceiver terminal, the second signal transceiver terminal determines that the first signal transceiver terminal requests to end of data transmission, the second signal transceiver terminal ends data transmission and the second signal transceiver terminal returns to the standby state.

9. The signal transceiving system according to claim 1, further including a third signal transceiver terminal,
the first signal transceiver terminal enables the second signal transceiver terminal and the third signal transceiver terminal via a first enable pin and a second enable pin, respectively; and
a second time slot of the third signal transceiver terminal is independently determined from the first time slot of the second signal transceiver terminal.

10. A signal transceiving method applied to a signal transceiving system including a first signal transceiver terminal a second signal transceiver terminal wired coupled to the first signal transceiver terminal, the signal transceiving method including:
transmitting a digital signal from the first signal transceiver terminal to the second signal transceiver terminal;
in response to detection of a first signal edge, starting counting of a first time slot by the second signal transceiver terminal; and
based on a count of at least one signal edge detected during the first time slot, judging the digital signal as being logic "0" or logic "1" by the second signal transceiver terminal;
wherein the detection of the first signal edge comprises that signal level of the digital signal rises or falls to a signal edge trigger reference level; and
wherein the second signal transceiver terminal includes an input/output pin group and at least two buffer groups, a plurality of digital signals received via the input/output pin groups and determined by the second signal transceiver terminal being alternatively written into and read from the buffer groups.

11. The signal transceiving method according to claim 10, wherein if the count of at least one signal edge detected during the first time slot is odd, the second signal transceiver terminal judges the digital signal as being logic "0".

12. The signal transceiving method according to claim 10, wherein if the count of at least one signal edge detected during the first time slot is even, the second signal transceiver terminal judges the digital signal as being logic "1".

13. The signal transceiving method according to claim 10, wherein the first signal edge includes a signal rising edge or a signal falling edge.

14. The signal transceiving method according to claim 10, wherein a length of the first time slot is predetermined, or dynamically determined by the first signal transceiver terminal and the second signal transceiver terminal.

15. The signal transceiving method according to claim 10, wherein if a delay between two adjacent time slots is longer than an allowable delay length, then the second signal transceiver terminal determines transmission failed.

16. The signal transceiving method according to claim 10, wherein the second signal transceiver terminal further records the first signal edge as being a signal rising edge or a signal falling edge.

17. The signal transceiving method according to claim 10, wherein
the first signal transceiver terminal includes a first pin and the second signal transceiver terminal includes a second pin;
the first signal transceiver terminal and the second signal transceiver terminal are in a standby state;
the first signal transceiver terminal sends an operation command via the first pin to the second signal transceiver terminal, wherein the second signal transceiver terminal is enabled by an initial signal edge of the operation command;
the first signal transceiver terminal sends an address via the first pin to the second signal transceiver terminal;

the first signal transceiver terminal enters into an input state, the second signal transceiver terminal starts to prepare data and the second signal transceiver terminal maintains a current status of a bus;

when the second signal transceiver terminal is ready to output data, the second signal transceiver terminal sends data via the second pin to the first signal transceiver terminal;

if the first signal transceiver terminal determines that data is enough, the first signal transceiver terminal controls a level of the bus and the first signal transceiver terminal returns to the standby state; and if the second signal transceiver terminal detects that the level of the bus is different from a bus level sent by the second signal transceiver terminal, the second signal transceiver terminal determines that the first signal transceiver terminal requests to end of data transmission, the second signal transceiver terminal ends data transmission and the second signal transceiver terminal returns to the standby state.

18. The signal transceiving method according to claim 10, wherein the signal transceiving system further including a third signal transceiver terminal, the first signal transceiver terminal enables the second signal transceiver terminal and the third signal transceiver terminal via a first enable pin and a second enable pin, respectively; and a second time slot of the third signal transceiver terminal is independently determined from the first time slot of the second signal transceiver terminal.

\* \* \* \* \*